United States Patent
Senba

(10) Patent No.: US 9,294,646 B2
(45) Date of Patent: Mar. 22, 2016

(54) IMAGE FORMING APPARATUS AND DETACHABLE CONTROL PANEL FOR CONTROLLING POWER SUPPLY TO THE CONTROL PANEL

(71) Applicant: Kei Senba, Saitama (JP)

(72) Inventor: Kei Senba, Saitama (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 14/600,562

(22) Filed: Jan. 20, 2015

(65) Prior Publication Data
US 2015/0215484 A1  Jul. 30, 2015

(30) Foreign Application Priority Data
Jan. 27, 2014 (JP) ................. 2014-012387

(51) Int. Cl.
G06F 3/12 (2006.01)
G06K 15/00 (2006.01)
H04N 1/00 (2006.01)
G06F 1/32 (2006.01)

(52) U.S. Cl.
CPC .......... *H04N 1/00901* (2013.01); *G06F 1/3231* (2013.01); *G06F 1/3284* (2013.01); *G06F 3/1221* (2013.01); *G06K 15/406* (2013.01); *G06K 15/4055* (2013.01); *H04N 1/00888* (2013.01); *H04N 1/00891* (2013.01); *H04N 1/00893* (2013.01); *H04N 1/00907* (2013.01)

(58) Field of Classification Search
CPC .......... H02J 7/35; H02J 9/061; H02J 7/0068; G06F 1/263; G06F 1/26; G06F 1/1635; G06F 1/3231; G06F 1/3296; G06F 1/03547; H04N 1/00901; G03G 15/5004; G06K 15/4055

USPC ............... 358/1.13, 1.14, 1.15; 320/101, 103, 320/108, 149, 11; 700/286, 22, 28; 307/80, 307/85; 455/41.1, 556.1, 557; 345/156, 345/173, 211; 713/300, 320, 321, 323, 330, 713/340

See application file for complete search history.

(56) References Cited

U.S. PATENT DOCUMENTS

| | | | |
|---|---|---|---|
| 7,054,965 B2 * | 5/2006 | Bell ...................... | G06F 1/1626 345/1.1 |
| 2008/0211780 A1 * | 9/2008 | Bell et al. ...................... | 345/173 |

(Continued)

FOREIGN PATENT DOCUMENTS

| | | |
|---|---|---|
| JP | 2004-317719 | 11/2004 |
| JP | 2010-066372 | 3/2010 |

*Primary Examiner* — Mohammad Ghayour
*Assistant Examiner* — Jonathan R Beckley
(74) *Attorney, Agent, or Firm* — Harness, Dickey & Pierce, P.L.C.

(57) ABSTRACT

A novel electronic apparatus includes a main unit of the apparatus and a detachable control panel that can communicate with the main unit of the apparatus. The main unit of the apparatus includes a first power supply that supplies power to the entire main unit. The control panel includes a generating unit that generates power using external light, a voltage detection unit that detects the generated voltage by the generating unit, a second power supply that is charged by the generating unit and supplies power to the control panel, a control panel status detection unit that detects a status of the control panel, and a power supply control unit that controls supplying power to the control panel from at least either one of the first power supply or the second power supply based on the detection results by the voltage detection unit and the control panel status detection unit.

11 Claims, 8 Drawing Sheets

(56) References Cited

U.S. PATENT DOCUMENTS

| | | | |
|---|---|---|---|
| 2010/0268622 A1* | 10/2010 | Kikinis et al. | 705/27 |
| 2011/0066777 A1* | 3/2011 | Della Pia et al. | 710/106 |
| 2012/0096294 A1 | 4/2012 | Senba | |
| 2012/0127518 A1* | 5/2012 | Ogata | G06F 1/3231 358/1.15 |
| 2013/0026837 A1* | 1/2013 | Nozawa | H02J 7/0021 307/66 |
| 2014/0223201 A1* | 8/2014 | Chew | G06F 1/1635 713/300 |
| 2014/0313536 A1* | 10/2014 | Takeuchi | G06F 1/3296 358/1.14 |
| 2014/0355020 A1* | 12/2014 | Shiraishi | G06K 15/406 358/1.13 |
| 2015/0022837 A1* | 1/2015 | Kuroishi | G06F 15/4055 358/1.13 |

\* cited by examiner

IMAGE FORMING APPARATUS AND DETACHABLE CONTROL PANEL FOR CONTROLLING POWER SUPPLY TO THE CONTROL PANEL

CROSS-REFERENCE TO RELATED APPLICATION

This patent application is based on and claims priority pursuant to 35 U.S.C. §119 to Japanese Patent Application No. 2014-012387, filed on Jan. 27, 2014 in the Japan Patent Office, the entire disclosure of which is hereby incorporated by reference herein.

BACKGROUND

1. Technical Field

The present invention relates to an electronic apparatus and a control panel for the electronic apparatus.

2. Background Art

Recently, many people are becoming conscious and aware of environmental regulation and issue of environmental burden, and it is demanded to reduce power consumption of electronic apparatuses and electric appliances generally. As a result, in image forming apparatuses such as a copier, a facsimile, and a printer as electronic apparatuses that includes printing capability, more and more environment-friendly apparatuses that comply with low power consumption in a normal operating mode and an energy-saving mode are recently purchased, due to consciousness of environmental issues and a viewpoint of saving cost due to electric power consumption.

As examples of the technology described above, a technology to control power supply using secondary batteries charged by solar cells to reduce power consumption during the energy saving mode of the image forming apparatus has been proposed.

For example, there is proposed an image forming apparatus that determines if a user exists around the apparatus according to the change in output of a solar cell to reduce the power consumption of the image forming apparatus, transitions from the energy saving mode to the normal mode based on the determination that the user exists. The image forming apparatus further transitions to the energy saving mode if the image forming apparatus is not in use.

More specifically, the image forming apparatus is provided with the solar cells on the top of a control panel and an automatic document feeder (ADF). The image forming apparatus transitions to the energy saving mode determining that room lighting has been turned off if output of the solar cells falls off, and transitions to the normal operating mode determining that a user exists around the apparatus if output of the solar cell mounted on the control panel falls off.

SUMMARY

An example embodiment of the present invention provides a novel electronic apparatus that includes a main unit of the apparatus and a detachable control panel that can communicate with the main unit of the apparatus. The main unit of the apparatus includes a first power supply that supplies power to the entire main unit. The control panel includes a generating unit that generates power using external light, a voltage detection unit that detects the generated voltage by the generating unit, a second power supply that is charged by the generating unit and supplies power to the control panel, a control panel status detection unit that detects a status of the control panel, and a power supply control unit that controls supplying power to the control panel from at least either one of the first power supply or the second power supply based on the detection results by the voltage detection unit and the control panel status detection unit.

Further example embodiments of the present invention provide a novel control panel for operating the electronic apparatus that is detachable from the electronic apparatus. The control panel includes a generating unit that generates power using external light, a voltage detection unit that detects the generated voltage by the generating unit, a second power supply that is charged by the generating unit and supplies power to the control panel, a control panel status detection unit that detects a status of the control panel, and a power supply control unit that controls supplying power to the control panel from at least either one of the first power supply or the second power supply based on the detection results by the voltage detection unit and the control panel status detection unit.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION

Figure 1:
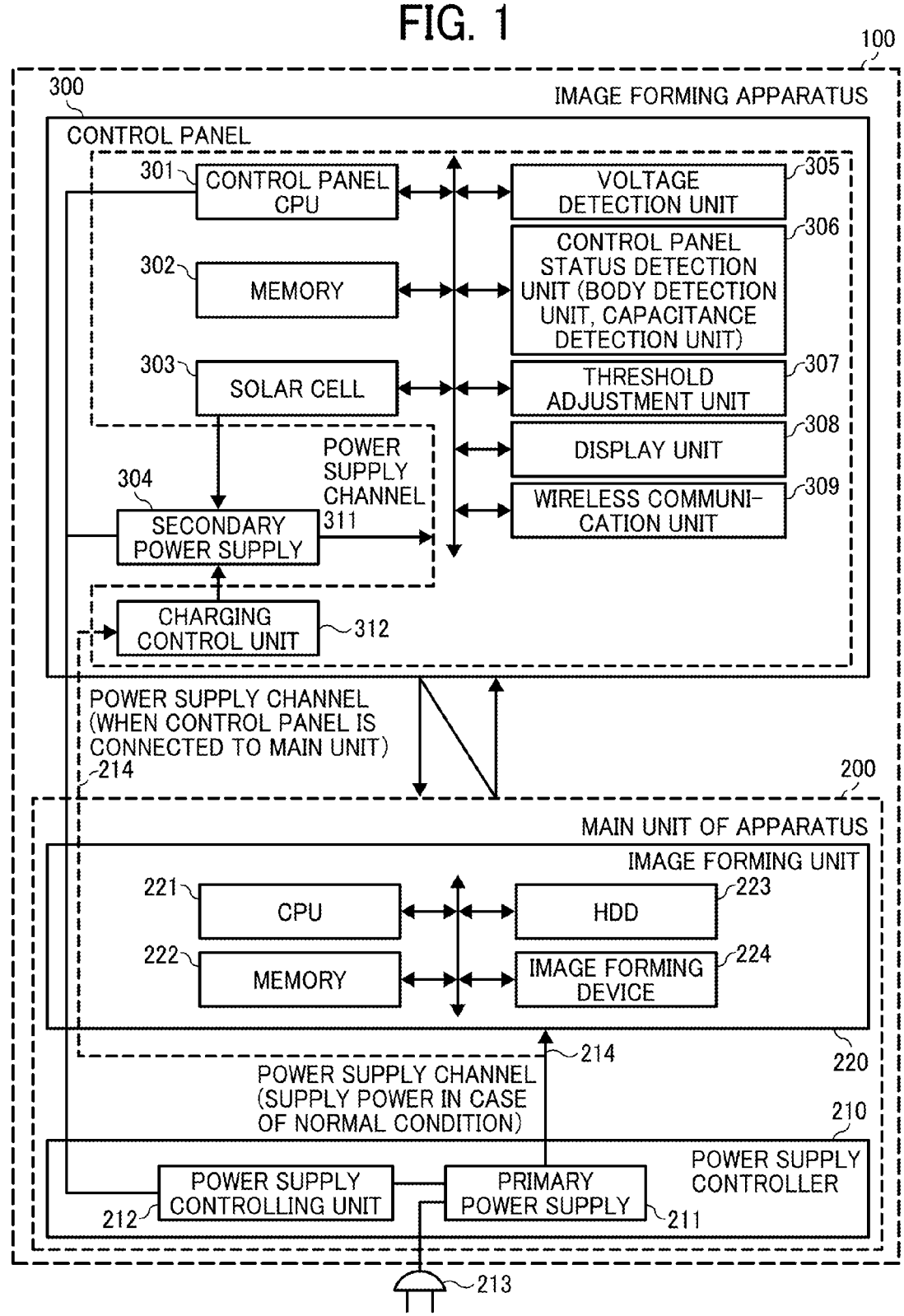
FIG. 1 is a block diagram illustrating a basic configuration of an image forming apparatus as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An image forming apparatus that includes a detachable and portable control panel that can communicate with the main unit of the image forming apparatus has been proposed. In the image forming apparatus described above, if the control panel is detached from the main unit of the image forming apparatus, it is impossible to supply power to the control panel from the main unit of the image forming apparatus.

In addition, in case of detaching the control panel from the main unit of the image forming apparatus and using the control panel, even if the control panel includes a chargeable battery, it is necessary to charge the internal battery preliminarily using an external AC adapter.

In the conventional technology described above, while the solar cell is mounted on the top of the control panel and it is determined if the user exists according to the change in output of the solar cell, the control panel on which the solar cell is mounted is fixed to the image forming apparatus, and the control panel cannot be detached from the main unit of the image forming apparatus.

It is thus desirable to provide an electronic apparatus that includes the detachable control panel, which can be supplied with power reliably.

The electronic apparatus in this embodiment is the image forming apparatus, and the image forming apparatus includes the main unit of the apparatus and the detachable control panel that can communicate with the main unit of the apparatus. In addition, the main unit of the apparatus includes a first power supply that supplies power to the entire main unit of the apparatus. Furthermore, the control panel includes a generating unit that generates power using external light, a voltage detection unit that detects generated voltage of the generating unit, a second power supply that is charged by the generating unit and supplies power to the control panel, a control panel status detection unit that detects status of the control panel, and a power supply controller that controls supplying power to the control panel using at least either one of the first power supply or the second power supply based on the detection results of the voltage detection unit.

First Embodiment

A configuration of the image forming apparatus 100 as the electronic apparatus in this embodiment is described below. FIG. 1 is a block diagram illustrating a basic configuration of an image forming apparatus in this embodiment. The image forming apparatus 100 includes the main unit of the apparatus 200 and the detachable control panel 300 that can communicate with the main unit of the apparatus 200. In addition, the main unit of the apparatus 200 consists of a power supply controller 210 and an image forming unit 220.

The power supply controller 210 includes a first power supply 211 that supplies DC power to the entire image forming unit 220 in the image forming apparatus 100 in the normal operating mode and a power supply controlling unit 212. The first power supply 211 supplies power to the entire image forming unit 220 via a power supply path 214 in the normal operating mode. The power supply controlling unit 212 controls supplying power to the control panel 300 using either the first power supply 211 or the second power supply 304 based on a detection result of a voltage detection unit 305 and a control panel status detection unit 306. It is controlled that the first power supply 211 charges the second power supply 304 in the control panel 300 when the control panel 300 is attached to the image forming unit in the main unit of the apparatus 200. It should be noted that a symbol 213 indicates a connecion to the commercial AC power source. In addition, a symbol 214 indicates a power supplying path that the first power supply 211 supplies power to the control panel 300 if the control panel 300 is attached to the main unit of the apparatus 200.

The image forming unit 220 includes a Central Processing Unit (CPU) 221, a memory 222, and a hard disk driver (HDD) 223, and an image forming unit 224 that forms an image. The CPU 221 controls the operation of the image forming unit 220. The memory 222 consists of a Read Only Memory (ROM) and a Random Access Memory (RAM), forms image data for a print job, and stores data temporarily when the CPU 221 processes data. The HDD 223 stores the image data of the print job formed by the memory 222 and reads out the stored image data.

The image forming unit 224 reads out the image data formed by the memory 222 and the image data stored in the HDD 223 and prints it on a recording sheet as a recording medium. The image forming unit 224 includes an electrophotographic image forming unit for example. It should be noted that the image forming unit 224 can adopt not only the electrophotographic image forming unit but also an inkjet image forming unit.

The control panel 300 includes a CPU 301, a memory 302, a solar cell 303, a second power supply 304, a voltage detection unit 305, a control panel status detection unit 306, a threshold adjustment unit 307, a display unit 308, a wireless communication unit 309, and a charge control unit 312. The main unit CPU 301 controls the control panel 300. In addition, the control panel CPU 301 functions as a connection detection unit that detects whether or not the control panel 300 is connected to the main unit of the apparatus 200 physically. The memory 302 consists of a ROM and a RAM, stores drawing data for the display unit 308, and stores data temporarily when the control panel CPU 301 processes data. The solar cell 303 generates power using external light and charges the second power supply 304. In addition, known material such as amorphous silicon can be used of the solar cell 303. In addition, instead of the solar cell 303, it is possible to use LED generator that generates power by receiving light from LED luminescent light or the sun using multiple LED devices.

The second power supply 304 stores DC power generated by the first power supply 211 and the solar cell 303 and supplies power to the control panel 300. It is possible to use a known second battery such as a lithium ion secondary battery and a nickel-hydrogen secondary battery for the second power supply 304.

The voltage detection unit 305 detects the generated voltage of the solar cell 303. As a result, it is possible to detect that the light from the light source to the solar cell 303 is cut off by an operator. The control panel status detection unit 306 detects the status of the control panel 300, i.e., whether or not the operator exists adjacent to the control panel 300 (described in detail later).

The threshold adjustment unit 307 stores multiple threshold parameters of generated voltage of the solar cell 303 in accordance with photoreception level of external light converted from an illumination condition at a site where the control panel 300 is located and physical location condition (location and aspect) of the control panel 300 in the memory 302 and manages those threshold parameters. As a result, it is possible to configure and adjust the threshold of the generated voltage of the solar cell 303 preliminarily using the display unit 308 in accordance with the illumination condition at the site where the control panel 300 is located and physical location condition (location and aspect) of the control panel 300. In the image forming apparatus 100 in this embodiment, in addition to charging the second power supply 304 by generated power, the solar cell 303 also functions as a sensor for determining whether or not the light coming into the solar cell 303 is cut off after the control panel 300 enters in shade of lighting.

The display unit 308 consists of a liquid crystal touch panel and other units and configures various printing settings in addition to displaying various information on the printing settings of the image forming apparatus 100. The wireless communication unit 309 performs wireless communication between the control panel 300 and the main unit of the apparatus 200. It should be noted that the symbol 311 indicates a power supply path that the second power supply 304 supplies power to the entire control panel 300 in the normal operating mode.

Based on the instruction by the control panel CPU 301, the charge control unit 312 stops supplying power to the control panel CPU 301 from the second power supply 304. In case of supplying power from the first power supply 211 in the power supply controller 210, the charge control unit 312 charges the second power supply 304 using power output by the first power supply 211.

The image forming apparatus 100 includes a human body detection unit as the control panel status detection unit 306 and determines whether or not the human exists by detecting the operator who dismounts the control panel status detection unit 306 from the main unit of the apparatus 200 and utilize the control panel status detection unit 306.

Next, an operation of the image forming apparatus 100 is described below.

Figure 2:
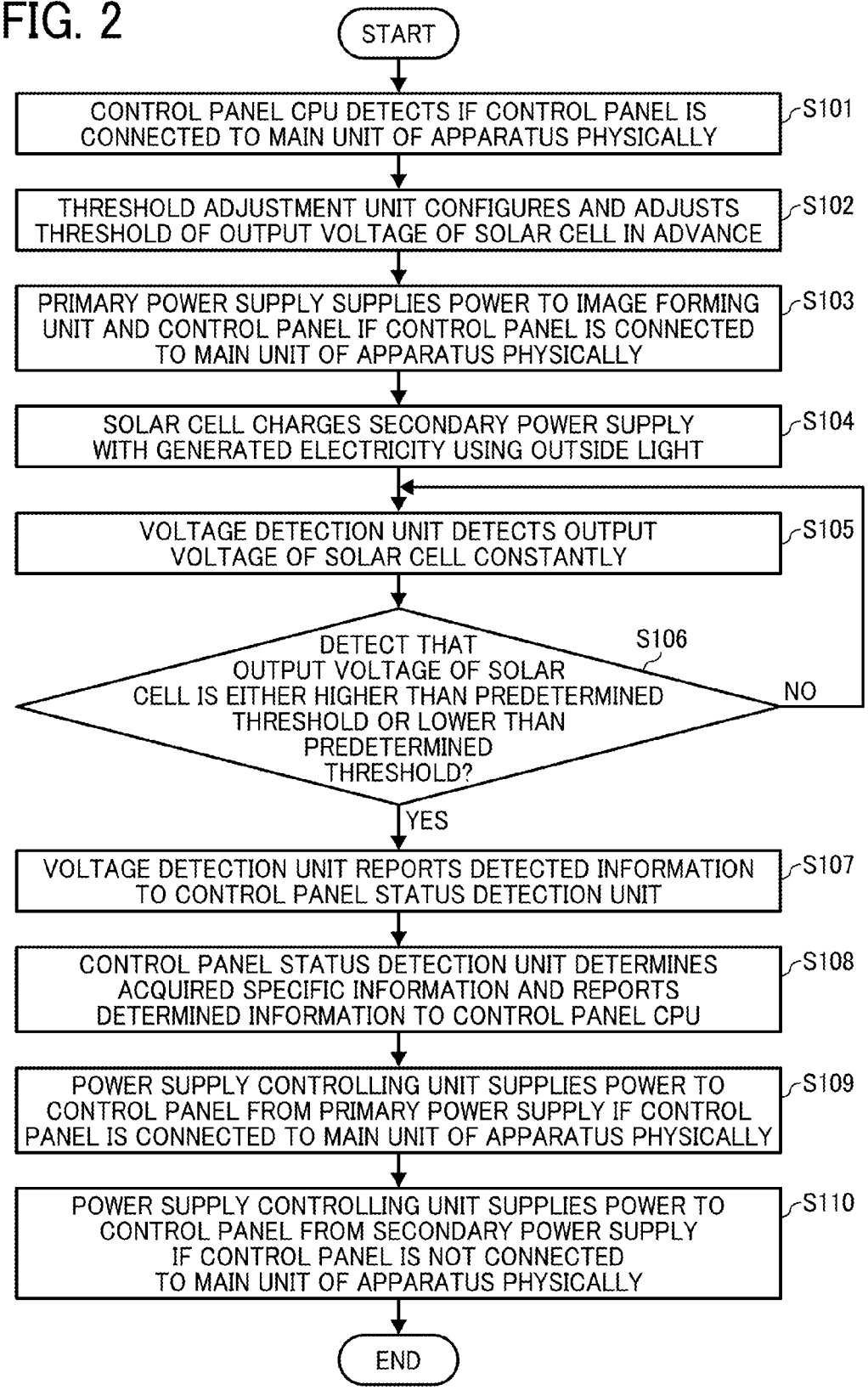
FIG. 2 is a flowchart illustrating a basic operation of the image forming apparatus as an embodiment of the present invention.

FIG. 2 is a flowchart illustrating a basic operation of the image forming apparatus 100. The control panel CPU 301 detects whether or not the control panel 300 is connected to the main unit of the apparatus 200 physically in S101. In addition, the threshold of the generated voltage of the solar cell 303 is configured and adjusted preliminarily using the threshold adjustment unit 307 by user operation on the display unit 308 in S102. If the control panel 300 is connected to the image forming unit 220 in the main unit of the apparatus 200 physically, the power supply controlling unit 212 supplies power to the entire main unit of the image forming unit 220 via the power supply path 214 from the first power supply 211 in the power supply controller 210. At the same time, the first power supply 211 in the power supply controller 210 supplies power to the control panel 300 via the power supply path 214 in S103.

In addition, the solar cell 303 charges the second power supply 304 by power generated using external light in S104. Under the condition described above, the voltage detection unit 305 always monitors the generated voltage of the solar cell 303 in S105. If the voltage detection unit 305 determines that the generated voltage of the solar cell 303 is either larger than the predetermined threshold or less than the predetermined threshold (YES in S106), the voltage detection unit 105 notifies the control panel status detection unit 306 of the detected information in S107. Next, after receiving the notified information, the control panel status detection unit 306 determines the received predetermined specific information and notifies the control panel CPU 301 of the determined information in S108.

Regarding supplying power to the control panel 300 by the power supply controlling unit 212, if the control panel CPU 301 detects that the control panel 300 is connected to the image forming unit 220 physically, the control panel CPU 301 outputs a power supplying signal to the first power supply 211 in the power supply controller 210, and the first power supply 211 in the power supply controller 210 supplies power to the control panel 300 in S109. By contrast, if the control panel CPU 301 detects that the control panel 300 is not connected to the image forming unit 220 physically, the control panel CPU 301 outputs the power supplying signal to the second power supply 304 such as the secondary battery in the control panel 300, and the second power supply 304 such as the secondary battery supplies power to the control panel 300 in S110.

In the first embodiment, the power source that supplies power to the control panel is selected based on the condition that the control panel is mounted on the main unit of the apparatus, the generated voltage of the solar cell, and the detection result of the control panel status detection unit. Consequently, it is possible to select the best suited power supply in accordance with the mounting condition of the control panel on the main unit of the apparatus and the usage condition of the control panel. As a result, even if the control panel is dismounted from the main unit of the apparatus and used, the problem that the main unit of the apparatus cannot be supply power to the control panel can be solved. Furthermore, it is unnecessary to charge the battery in the control panel using the external AC adapter preliminarily in case of using the control panel dismounted from the image forming apparatus.

Second Embodiment

Next, the image forming apparatus as the electronic apparatus in the second embodiment is described below. Basically, the image forming apparatus in this embodiment consists of the same configuration as the image forming apparatus in FIG. 1. In the image forming apparatus in this embodiment, the control panel status detection unit 306 is a human body detection unit that can detect a human body who uses the control panel 300. The human body detection unit detects the human body using infrared, supersonic, and visible light etc. By using the methods described above, the human body detection unit detects the human body who operates the control panel 300.

Figure 3:
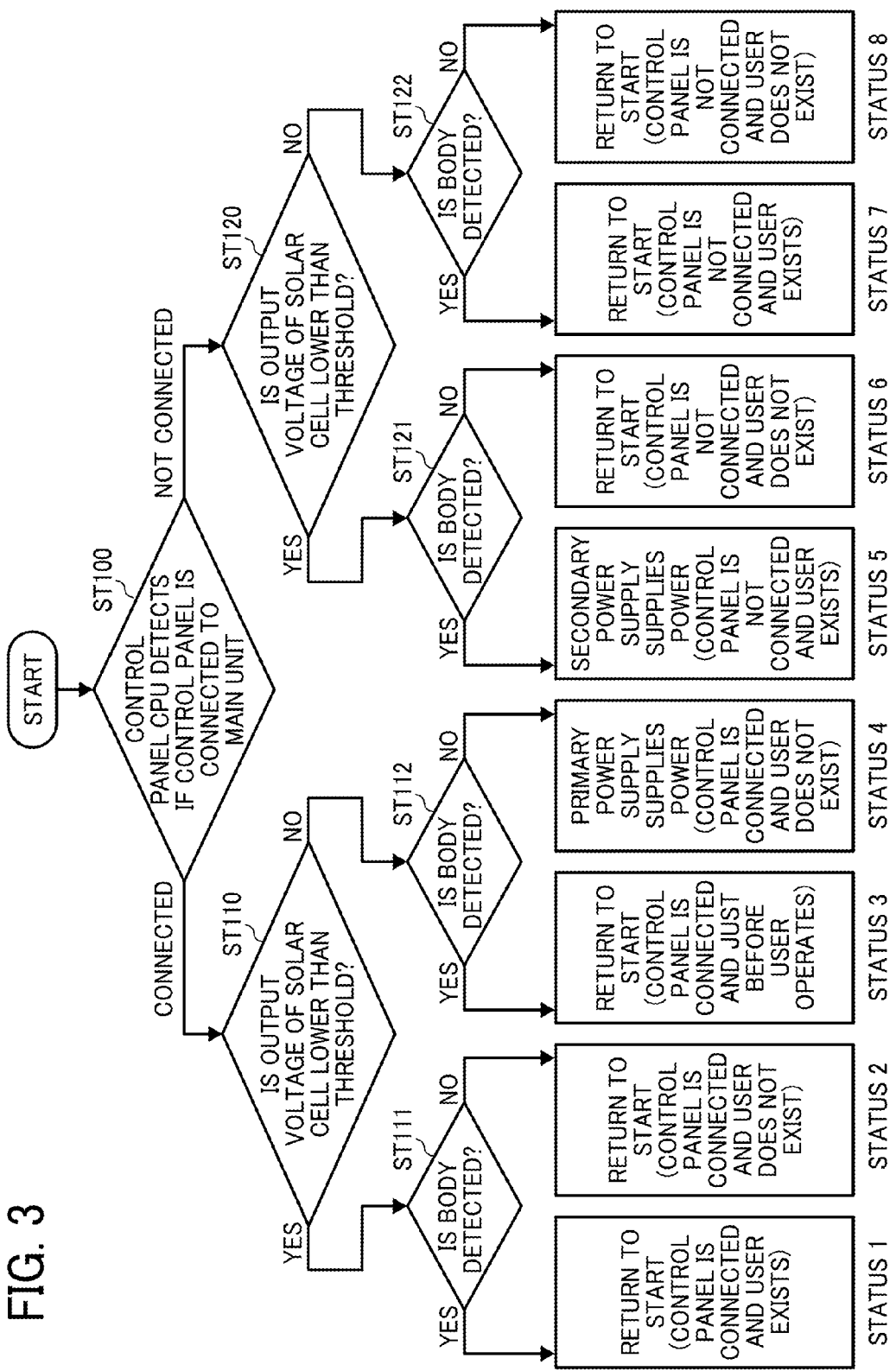
FIG. 3 is a flowchart illustrating an operation of the image forming apparatus as another embodiment of the present invention.

First, a basic operation of the image forming apparatus 100 in this embodiment is described below. FIG. 3 is a flowchart illustrating an operation of the image forming apparatus as an electronic apparatus in this embodiment. In this embodiment, the power supply control unit 212 switches the power source to the control panel 300 from the first power supply 211 into the second power supply 304 and vice versa based on the detection results of the control panel 300 by the control panel CPU 301 (ST100), the comparison result between the voltage of the solar cell detected by the voltage detection unit 305 and the predetermined threshold (ST110 and ST120), and the detection result of the human body by the control panel status detection unit 306 (ST111, ST112, ST121, and ST122).

Putting it all together, those statuses above are described below.

Status 1 (If the control panel 300 is connected to the main unit of the apparatus 200, the voltage of the solar cell 303 is less than the threshold, and the human body is detected): The control panel 300 is connected, the solar cell is located in the shade of the lighting, and the operator exists. In this case, the first power supply 211 supplies power to the control panel 300.

Status 2 (If the control panel 300 is connected to the main unit of the apparatus 200, the voltage of the solar cell 303 is less than the threshold, and the human body is not detected): The control panel 300 is connected, the solar cell is located in the shade of the lighting, and the operator does not exist. In this case, the first power supply 211 supplies power to the control panel 300.

Status 3 (If the control panel 300 is connected to the main unit of the apparatus 200, the voltage of the solar cell 303 is larger than the threshold, and the human body is detected): The control panel 300 is connected, the solar cell is illuminated, and the operator exists. In this case, the first power supply 211 supplies power to the control panel 300.

Status 4 (If the control panel 300 is connected to the main unit of the apparatus 200, the voltage of the solar cell 303 is larger than the threshold, and the human body is not detected):

The control panel 300 is connected, the solar cell is illuminated, and the operator does not exist. In this case, the control panel 300 is mounted on the main unit of the apparatus 200, and the operator does not exist. In this case, the first power supply 211 supplies power to the control panel 300.

Status 5 (If the control panel 300 is not connected to the main unit of the apparatus 200, the voltage of the solar cell 303 is less than the threshold, and the human body is detected): The control panel 300 is not connected, the control panel 300 is located in the shade of the lighting, and the operator exists. In this case, the second power supply 304 supplies power to the control panel 300.

Status 6 (If the control panel 300 is not connected to the main unit of the apparatus 200, the voltage of the solar cell 303 is less than the threshold, and the human body is not detected): The control panel 300 is not connected, the control panel 300 is located in the shade of the lighting, and the operator does not exist. In this case, the second power supply 304 supplies power to the control panel 300.

Status 7 (If the control panel 300 is not connected to the main unit of the apparatus 200, the voltage of the solar cell 303 is larger than the threshold, and the human body is detected): The control panel 300 is not connected, the control panel 300 is illuminated, and the operator exists. In this case, the second power supply 304 supplies power to the control panel 300.

Status 8 (If the control panel 300 is not connected to the main unit of the apparatus 200, the voltage of the solar cell 303 is larger than the threshold, and the human body is not detected): The control panel 300 is not connected, the control panel 300 is illuminated, and the operator does not exist. In this case, the second power supply 304 supplies power to the control panel 300.

Figure 4:
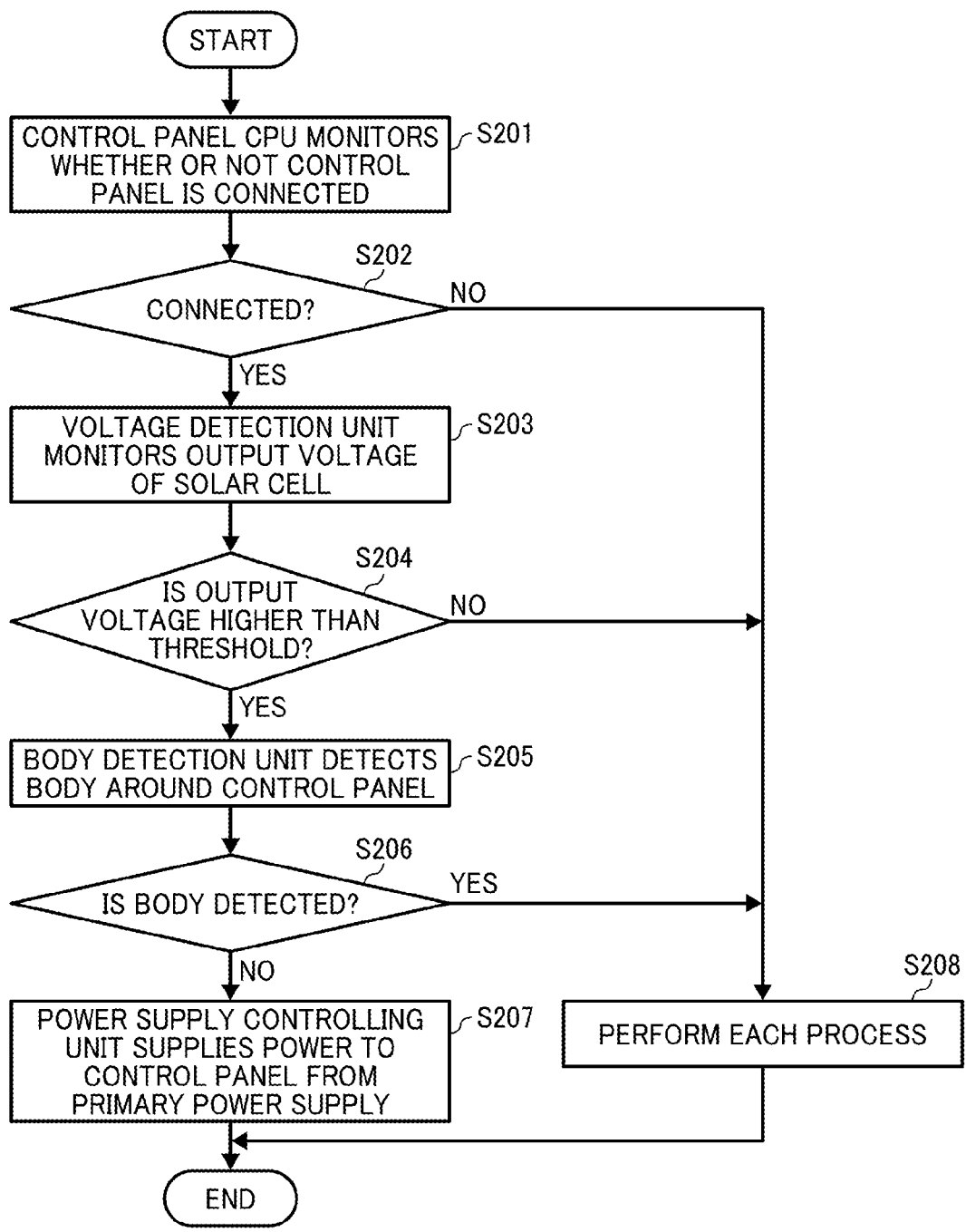
FIG. 4 is a flowchart illustrating an operation in Status 4 of the image forming apparatus as another embodiment of the present invention.

A process of the electronic apparatus in this embodiment is described below in detail taking Status 4 and Status 5 as examples. First, Status 4 that the control panel 300 is connected to the main unit of the apparatus 200, the voltage of the solar cell 303 is larger than the threshold, and the human body is not detected is described below. FIG. 4 is a flowchart illustrating an operation in Status 4 of the image forming apparatus in this embodiment.

The threshold of the generated voltage of the solar cell 303 is configured and adjusted preliminarily using the threshold adjustment unit 307 by user operation on the display unit 308. Under the condition described above, the control panel CPU 301 detects whether or not the control panel 300 is connected to the main unit of the apparatus 200 physically in S201. In addition, the control panel CPU 301 detects the generated voltage of the solar cell 303 using the voltage detection unit 305 in S203 and detects the human body using the human body detection unit in the control panel status detection unit 306 in S205.

Under the condition described above, if the control panel 300 is connected to the main unit of the apparatus 200 in S202, the detected voltage generated by the solar cell 303 is larger than the threshold in S204, and the human body is not detected in S206, the power supply controlling unit 212 instructs the first power supply 211 to supply power to the control panel 300 in S207. If it is determined differently from the cases described above in steps S202, S204, and S206, the step transitions to the process for each case in S208. As described above, if the control panel 300 is connected to the main unit of the apparatus 200, the voltage of the solar cell 303 is larger than the threshold, and the human body is not detected, the first power supply supplies power to the control panel 300 appropriately.

Figure 5:
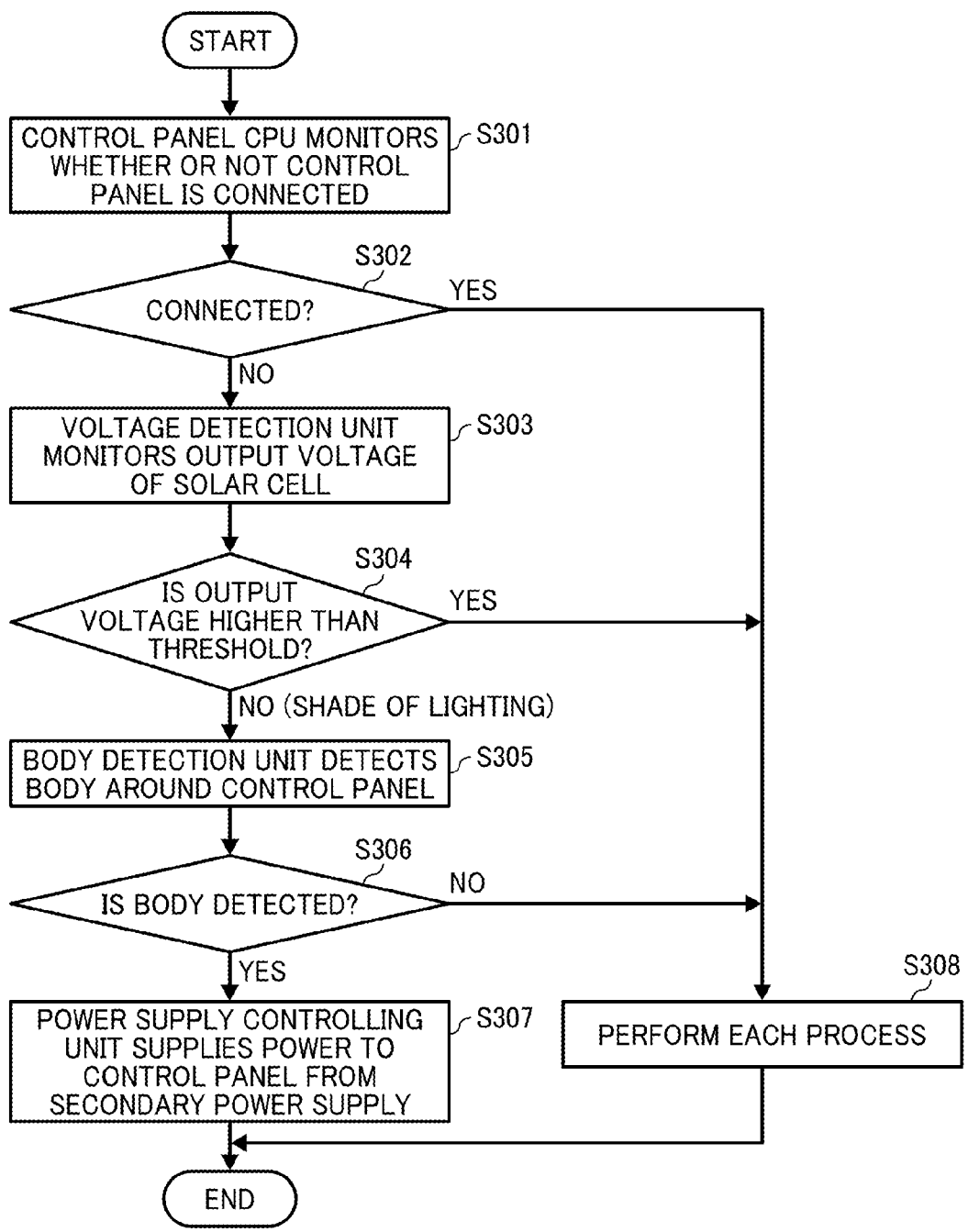
FIG. 5 is a flowchart illustrating an operation in Status 5 of the image forming apparatus as another embodiment of the present invention.

Next, Status 5 that the control panel 300 is not connected to the main unit of the apparatus 200, the voltage of the solar cell 303 is less than the threshold, and the human body is detected is described below. FIG. 5 is a flowchart illustrating an operation in Status 5 of the image forming apparatus in this embodiment.

The threshold of the generated voltage of the solar cell 303 is configured and adjusted preliminarily using the threshold adjustment unit 307 by user operation on the display unit 308. Under the condition described above, the control panel CPU 301 detects whether or not the control panel 300 is connected to the main unit of the apparatus 200 physically in S301. In addition, the control panel CPU 301 detects the generated voltage of the solar cell 303 using the voltage detection unit 305 in S303 and detects the human body using the human body detection unit in the control panel status detection unit 306 in S305.

Under the condition described above, if the control panel 300 is not connected to the main unit of the apparatus 200 in S302, the detected voltage generated by the solar cell 303 is less than the threshold in S304, and the human body is detected in S306, the power supply controlling unit 212 instructs the second power supply 304 to supply power to the control panel 300 in S307.

If it is determined differently from the cases described above in steps S302, S304, and S306, the step transitions to the process for each case in S308. As described above, if the control panel 300 is not connected to the main unit of the apparatus 200, the voltage of the solar cell 303 is less than the threshold, and the human body is detected, the second power supply supplies power to the control panel 300 appropriately.

Figure 6:
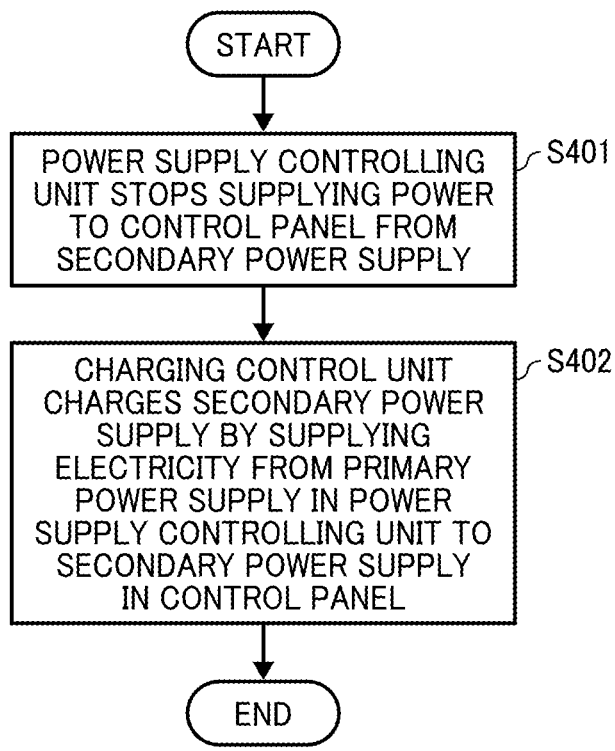
FIG. 6 is a flowchart illustrating an operation of a charge control unit in the image forming apparatus as another embodiment of the present invention.

In this embodiment, the charge control unit 312 operates as described below. FIG. 6 is a flowchart illustrating an operation of the charge control unit in this embodiment. If the control panel CPU 221 detects that the control panel 300 is connected to the main unit of the apparatus 200, the power supply control unit 212 instructs the second power supply 304 to stop supplying power to the control panel 300 in S401. As a result, the first power supply 211 supplies power to the control panel 300. Subsequently, the charge control unit 312 instructs the first power supply 211 in the power supply control unit 210 to supply power to the second power supply 304 in the control panel 300 to charge the second power supply 304 in S402. As a result, it is possible to charge the second power supply 304 appropriately in accordance with the mounting condition of the control panel 300 on the main unit of the apparatus.

In the second embodiment, the power source that supplies power to the control panel is selected based on the condition that the control panel is mounted on the main unit of the apparatus, whether or not the control panel is located in the shade of the operator by considering the generated voltage of the solar cell, and whether or not the human body is detected by the control panel status detection unit. Consequently, it is possible to select the best suited power supply for charging the second power supply in accordance with the mounting condition of the control panel on the main unit of the apparatus, the layout condition of the control panel, and the usage condition of the control panel depending on whether or not the human body is close to the control panel.

Third Embodiment

Next, the third embodiment is described below. In this embodiment, the control panel status detection unit 306 includes a capacitance detection unit that detects capacitance. The capacitance detection unit detects the material of the control panel 300, i.e., change of capacitance on an exterior cover and a liquid crystal panel etc. in the control panel 300.

As a result, it is possible to determine whether or not the operator who detaches the control panel 300 from the main unit of the apparatus 200 and use the control panel 300 exists. Therefore, the same determination shown in FIG. 3 is performed.

Figure 7:
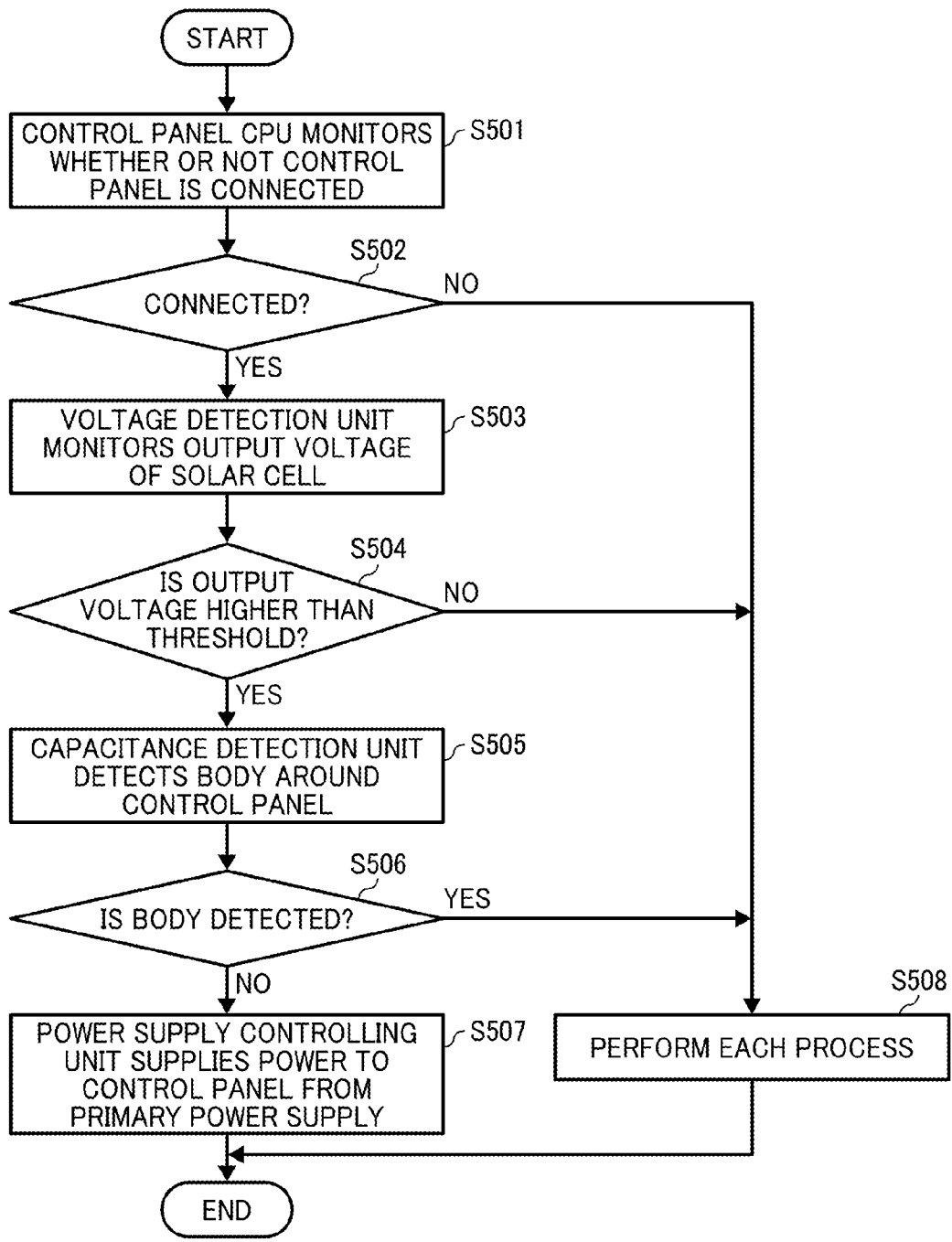
FIG. 7 is a flowchart illustrating an operation in Status 4 of the image forming apparatus as yet another embodiment of the present invention.

A process of the electronic apparatus in this embodiment is described below in detail taking Status 4 and Status 5 as examples. First, Status 4 that the control panel 300 is connected to the main unit of the apparatus 200, the voltage of the solar cell 303 is larger than the threshold, and the human body is not detected is described below. FIG. 7 is a flowchart illustrating an operation in Status 4 of the image forming apparatus in this embodiment.

The threshold of the generated voltage of the solar cell 303 is configured and adjusted preliminarily using the threshold adjustment unit 307 by user operation on the display unit 308. Under the condition described above, the control panel CPU 301 detects whether or not the control panel 300 is connected to the main unit of the apparatus 200 physically in S501. The control panel CPU 301 detects the generated voltage of the solar cell 303 using the voltage detection unit 305 in S503 and detects the human body using the human body detection unit in the control panel status detection unit 306 in S505.

Under the condition described above, if the control panel 300 is connected to the main unit of the apparatus 200 in S502, the detected voltage generated by the solar cell 303 is larger than the threshold in S504, and the human body is not detected in S506, the power supply controlling unit 212 instructs the first power supply 211 to supply power to the control panel 300 in S507. If it is determined differently from the cases described above in steps S502, S504, and S506, the step transitions to the process for each case in S508. As described above, if the control panel 300 is connected to the main unit of the apparatus 200, the voltage of the solar cell 303 is larger than the threshold, and the human body is not detected, the first power supply supplies power to the control panel 300 appropriately.

Figure 8:
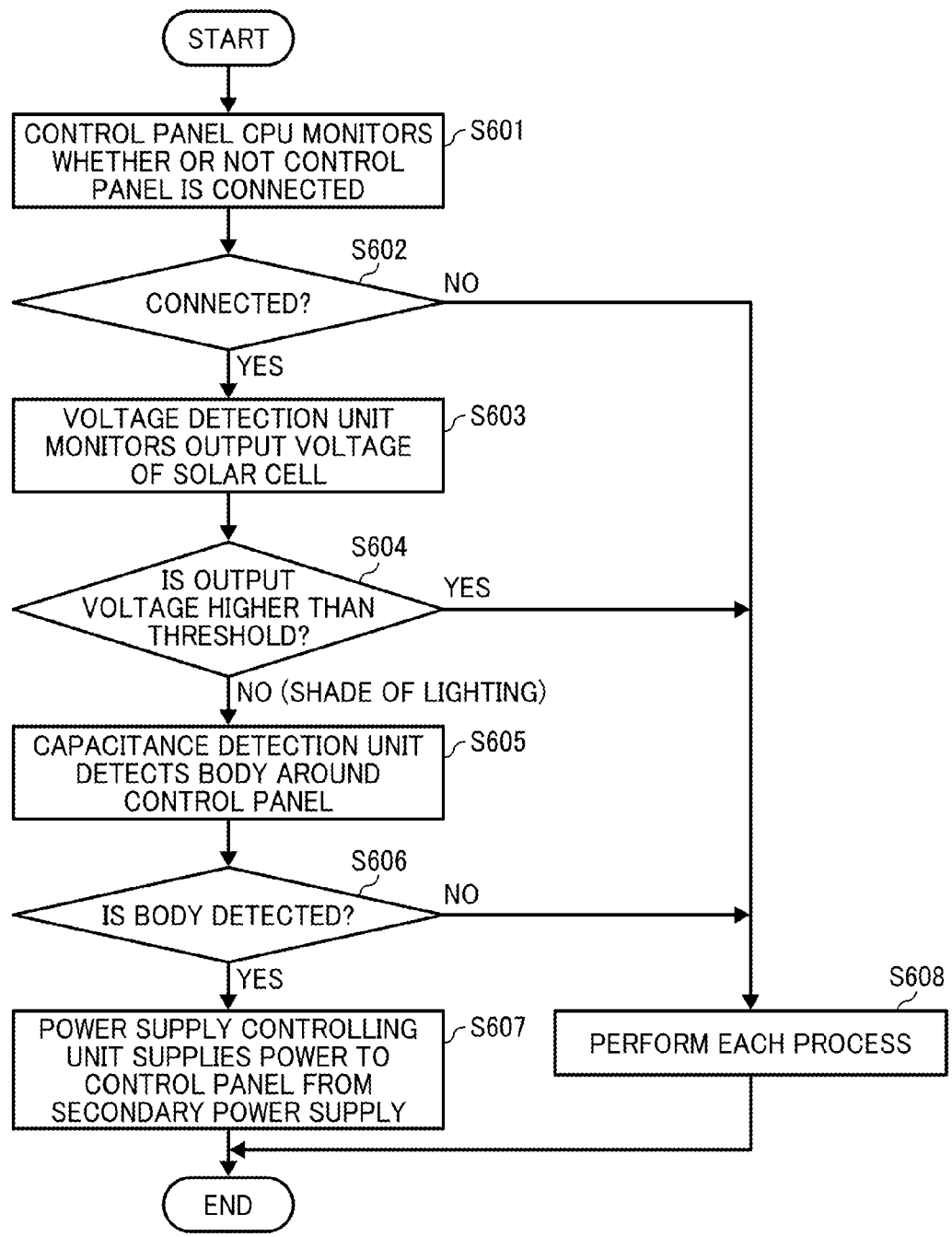
FIG. 8 is a flowchart illustrating an operation in Status 5 of the image forming apparatus as yet another embodiment of the present invention.

Next, Status 5 that the control panel 300 is not connected to the main unit of the apparatus 200, the voltage of the solar cell 303 is less than the threshold, and the human body is detected is described below. FIG. 8 is a flowchart illustrating an operation in Status 5 of the image forming apparatus in this embodiment.

The threshold of the generated voltage of the solar cell 303 is configured and adjusted preliminarily using the threshold adjustment unit 307 by user operation on the display unit 308. Under the condition described above, the control panel CPU 301 detects whether or not the control panel 300 is connected to the main unit of the apparatus 200 physically in S601. The control panel CPU 301 detects the generated voltage of the solar cell 303 using the voltage detection unit 305 in S603 and detects the human body using the human body detection unit in the control panel status detection unit 306 in S605.

Under the condition described above, if the control panel 300 is not connected to the main unit of the apparatus 200 in S602, the detected voltage generated by the solar cell 303 is less than the threshold in S604, and the human body is detected in S606, the power supply controlling unit 212 instructs the second power supply 304 to supply power to the control panel 300 in S607.

If it is determined differently from the cases described above in steps S602, S604, and S606, the step transitions to the process for each case in S608. As described above, if the control panel 300 is not connected to the main unit of the apparatus 200, the voltage of the solar cell 303 is less than the threshold, and the human body is detected, the second power supply supplies power to the control panel 300 appropriately.

It should be noted that the charge control unit 312 operates in the same way as the second embodiment.

In the third embodiment, the power source that supplies power to the control panel is selected based on the condition that the control panel is mounted on the main unit of the apparatus, whether or not the control panel is located in the shade of the operator by considering the generated voltage of the solar cell, and whether or not the human body is detected based on the capacitance detection result by the control panel status detection unit. Consequently, it is possible to select the best suited power supply for charging the second power supply in accordance with the mounting condition of the control panel on the main unit of the apparatus, the layout condition of the control panel, and the usage condition of the control panel depending on whether or not the human body is close to the control panel.

In the embodiments described above, the image forming apparatus is taken as an example of the electronic apparatus. The present invention can be applied to electronic apparatuses that include the main unit of the apparatus and the detachable control panel that can communicate with the main unit of the apparatus other than the image forming apparatus. That is, the present invention can be applied to image processing apparatuses such as a projector and a teleconference system etc.

The electronic apparatus in the first embodiment includes a main unit of the apparatus and a detachable control panel that can communicate with the main unit of the apparatus. The main unit of the apparatus includes a first power supply that supplies power to the entire main unit. The control panel includes a generating unit that generates power using external light, a voltage detection unit that detects the generated voltage by the generating unit, a second power supply that is charged by the generating unit and supplies power to the control panel, a control panel status detection unit that detects a status of the control panel, and a power supply control unit that controls supplying power to the control panel from at least either one of the first power supply or the second power supply based on the detection results by the voltage detection unit and the control panel status detection unit.

The electronic apparatus in the second embodiment further includes a connection detection unit that detects whether or not the control panel is connected to the main unit of the apparatus physically. The control panel status detection unit includes a human body detection unit that detects a human body. The power supply control unit instructs the second power supply to supply power to the control panel in case of detecting that the control panel is not connected to the main unit of the apparatus using the connection detection unit, determining that the generated voltage of the generating unit detected by the voltage detection unit is larger than a predetermined threshold, and detecting the human body by the human body detection unit.

The electronic apparatus in the third embodiment further includes a connection detection unit that detects whether or not the control panel is connected to the main unit of the apparatus physically. The control panel status detection unit includes a human body detection unit that detects a human body. The power supply control unit instructs the first power supply to supply power to the control panel in case of detecting that the control panel is connected to the main unit of the apparatus using the connection detection unit, determining that the generated voltage of the generating unit detected by the voltage detection unit is less than a predetermined threshold, and not detecting the human body by the human body detection unit.

The electronic apparatus in the fourth embodiment further includes a connection detection unit that detects whether or not the control panel is connected to the main unit of the apparatus physically. The control panel status detection unit includes a capacitance detection unit that detects a capacitance of the control panel. The power supply control unit instructs the second power supply to supply power to the control panel in case of detecting that the control panel is not connected to the main unit of the apparatus using the connection detection unit, determining that the generated voltage of the generating unit detected by the voltage detection unit is larger than a predetermined threshold, and detecting the human body based on the capacitance value detected by the capacitance detection unit.

The electronic apparatus in the fifth embodiment further includes a connection detection unit that detects whether or not the control panel is connected to the main unit of the apparatus physically. The control panel status detection unit includes a capacitance detection unit that detects a capacitance of the control panel. The power supply control unit instructs the second power supply to supply power to the control panel in case of detecting that the control panel is connected to the main unit of the apparatus using the connection detection unit, determining that the generated voltage of the generating unit detected by the voltage detection unit is less than a predetermined threshold, and not detecting the human body based on the capacitance value detected by the capacitance detection unit.

The electronic apparatus in the sixth embodiment further includes a charge control unit that charges the second power supply using the first power supply in case of stopping supplying power to the control panel by the second power supply and supplying power to the control panel by the first power supply.

The electronic apparatus in the seventh embodiment further includes an image forming unit that records an image on a recording medium.

With the configuration of at least one of the above-described embodiments, power consumption by the control panel can be reduced.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that, within the scope of the appended claims, the disclosure of this patent specification may be practiced otherwise than as specifically described herein. For example, it is possible that the image forming apparatus includes the document holding determination unit only. Alternatively, it is possible that the image forming apparatus includes the document holding determination unit and any one of or any combination of the rangefinder, the user authentication unit, the recovery processor, the print job acquisition unit, the auxiliary parameter setting unit, and the facsimile number setting unit.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of applicationspecific integrated circuits or by interconnecting an appropriate network of conventional component circuits, as will be readily apparent to those skilled in the relevant art.

What is claimed is:

1. An image forming apparatus, comprising:
a main unit; and
an image forming unit to form an image on a recording medium;
a control panel that communicates with the main unit and is detachable from the image forming apparatus;
a connection detection unit that detects a connection result indicating whether or not the control panel is physically connected to the main unit of the image forming apparatus,
wherein the main unit includes:
a first power supply to supply power to the image forming apparatus,
the control panel includes:
a generating unit to generate power using external light;
a voltage detection unit to detect a voltage amount indicating voltage of the power generated by the generating unit,
a second power supply to be charged by the generating unit and supply power to the control panel;
a control panel status detection unit to detect a status of the control panel and includes a human body detection unit to detect the status indicating whether or not a human body of an operator exists adjacent to the control panel; and
a power supply control unit to control supplying power to the control panel from at least one of the first power supply or the second power supply based on the connection result detected by the connection detection unit, the voltage amount detected by the voltage detection unit, and the status detected by the control panel status detection unit.

2. The image forming apparatus according to claim 1, wherein in a case when the connection result indicates the control panel is not connected, the voltage amount is larger than a predetermined threshold, and the status indicates the human body of the operator exists adjacent to the control panel;
the power supply control unit instructs the second power supply to supply power to the control panel.

3. The image forming apparatus according to claim 1, wherein in a case when the connection result indicates the control panel is connected, the voltage amount is equal to or less than a predetermined threshold, and the status indicates the human body of the operator exists adjacent to the control panel;
the power supply control unit instructs the first power supply to supply power to the control panel.

4. The image forming apparatus according to claim 1, wherein the control panel status detection unit includes a capacitance detection unit to detect a capacitance of the control panel, and the power supply control unit instructs the second power supply to supply power to the control panel in case of detecting that the control panel is not connected to the main unit of the apparatus using the connection detection unit, determining that the generated voltage of the generating unit detected by the voltage detection unit is larger than a predetermined threshold, and detecting the human body based on the capacitance value detected by the capacitance detection unit.

5. The image forming apparatus according to claim 1, wherein the control panel status detection unit includes a capacitance detection unit to detect a capacitance of the control panel, and the power supply control unit instructs the first power supply to supply power to the control panel in case of detecting that the control panel is connected to the main unit of the apparatus using the connection detection unit, determining that the generated voltage of the generating unit detected by the voltage detection unit is equal to or less than a predetermined threshold, and not detecting the human body based on the capacitance value detected by the capacitance detection unit.

6. The image forming apparatus according to claim 1, further comprising a charge control unit to charge the second power supply using the first power supply in case of stopping supplying power to the control panel by the second power supply and starting supplying power to the control panel by the first power supply.

7. A control panel for operating an image forming apparatus and being connected thereto, the image forming apparatus including a first power supply to supply power to the image forming apparatus and the connected control panel, wherein the control panel is detachable from the image forming apparatus, the control panel comprising:
  a connection detection unit that detects a connection result indicating whether or not the control panel is physically connected to the image forming apparatus;
  a generating unit to generate power using external light;
  a voltage detection unit to detect a voltage amount indicating voltage of the power generated by the generating unit,
  a second power supply to be charged by the generating unit and supply power to the control panel;
  a control panel status detection unit to detect a status of the control panel and includes a human body detection unit to detect the status indicating whether or not a human body of an operator exists adjacent to the control panel; and
  a power supply control unit to control supplying power to the control panel from at least one of the first power supply or the second power supply based on the connection result detected by the connection detection unit, the voltage amount detected by the voltage detection unit, and the status detected by the control panel status detection unit.

8. The control panel according to claim 7, wherein in a case when the connection result indicates the control panel is not connected, the voltage amount is larger than a predetermined threshold, and the status indicates the human body of the operator exists adjacent to the control panel;
  the power supply control unit instructs the second power supply to supply power to the control panel.

9. The control panel according to claim 7, wherein in a case when the connection result indicates the control panel is connected, the voltage amount is equal to or less than a predetermined threshold, and the status indicates the human body of the operator exists adjacent to the control panel;
  the power supply control unit instructs the first power supply to supply power to the control panel.

10. The control panel according to claim 7, wherein the control panel status detection unit includes a capacitance detection unit to detect a capacitance of the control panel, and the power supply control unit instructs the second power supply to supply power to the control panel in case of detecting that the control panel is not connected to the apparatus using the connection detection unit, determining that the generated voltage of the generating unit detected by the voltage detection unit is larger than a predetermined threshold, and detecting the human body based on the capacitance value detected by the capacitance detection unit.

11. The control panel according to claim 7, wherein the control panel status detection unit includes a capacitance detection unit to detect a capacitance of the control panel, and the power supply control unit instructs the first power supply to supply power to the control panel in case of detecting that the control panel is connected to the apparatus using the connection detection unit, determining that the generated voltage of the generating unit detected by the voltage detection unit is equal to or less than a predetermined threshold, and not detecting the human body based on the capacitance value detected by the capacitance detection unit.

* * * * *